April 21, 1953 — C. W. JACKMAN — 2,635,894
INDEPENDENT SUSPENSION
Filed Jan. 29, 1949 — 4 Sheets-Sheet 1

Inventor
Charles W. Jackman
Attorneys

April 21, 1953 C. W. JACKMAN 2,635,894
INDEPENDENT SUSPENSION
Filed Jan. 29, 1949 4 Sheets-Sheet 2
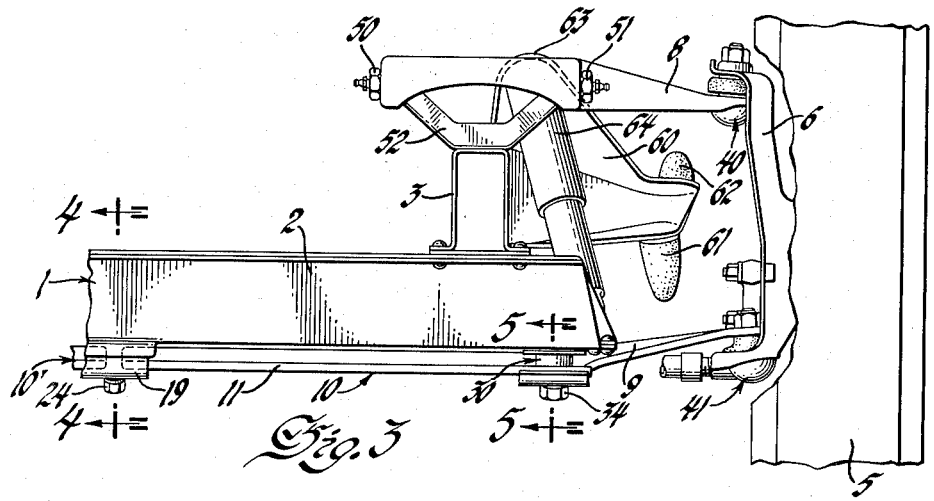
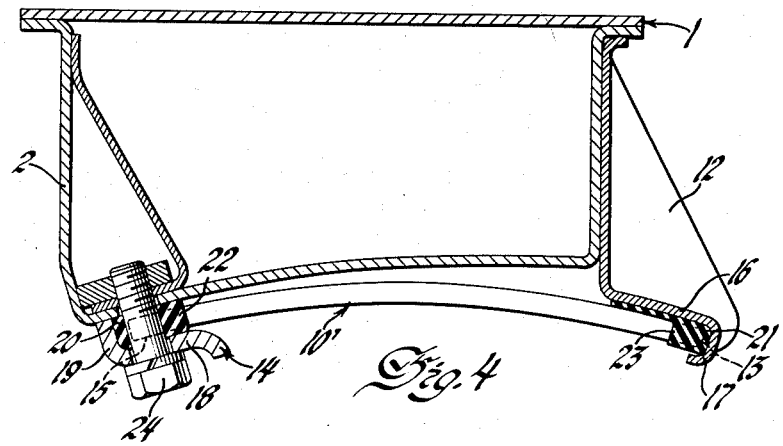
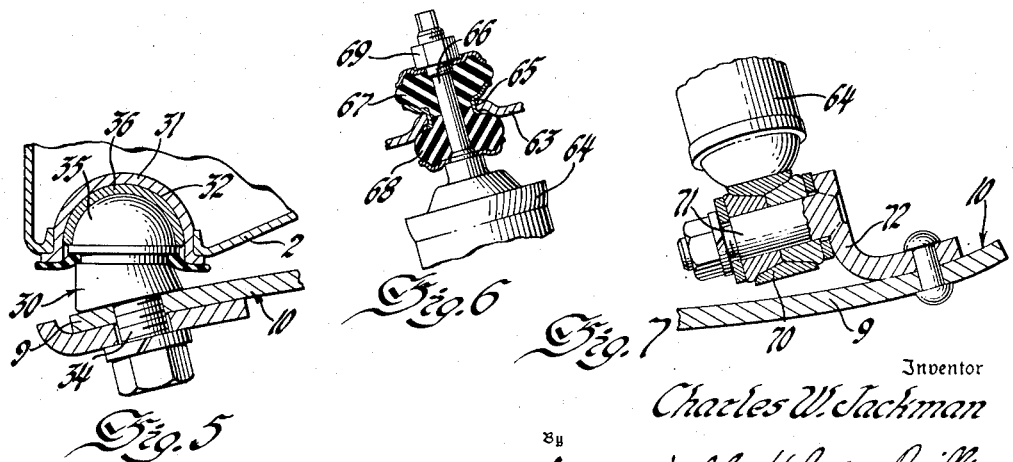
Inventor
Charles W. Jackman
By Spencer, Willits, Helwig & Baillio
Attorneys

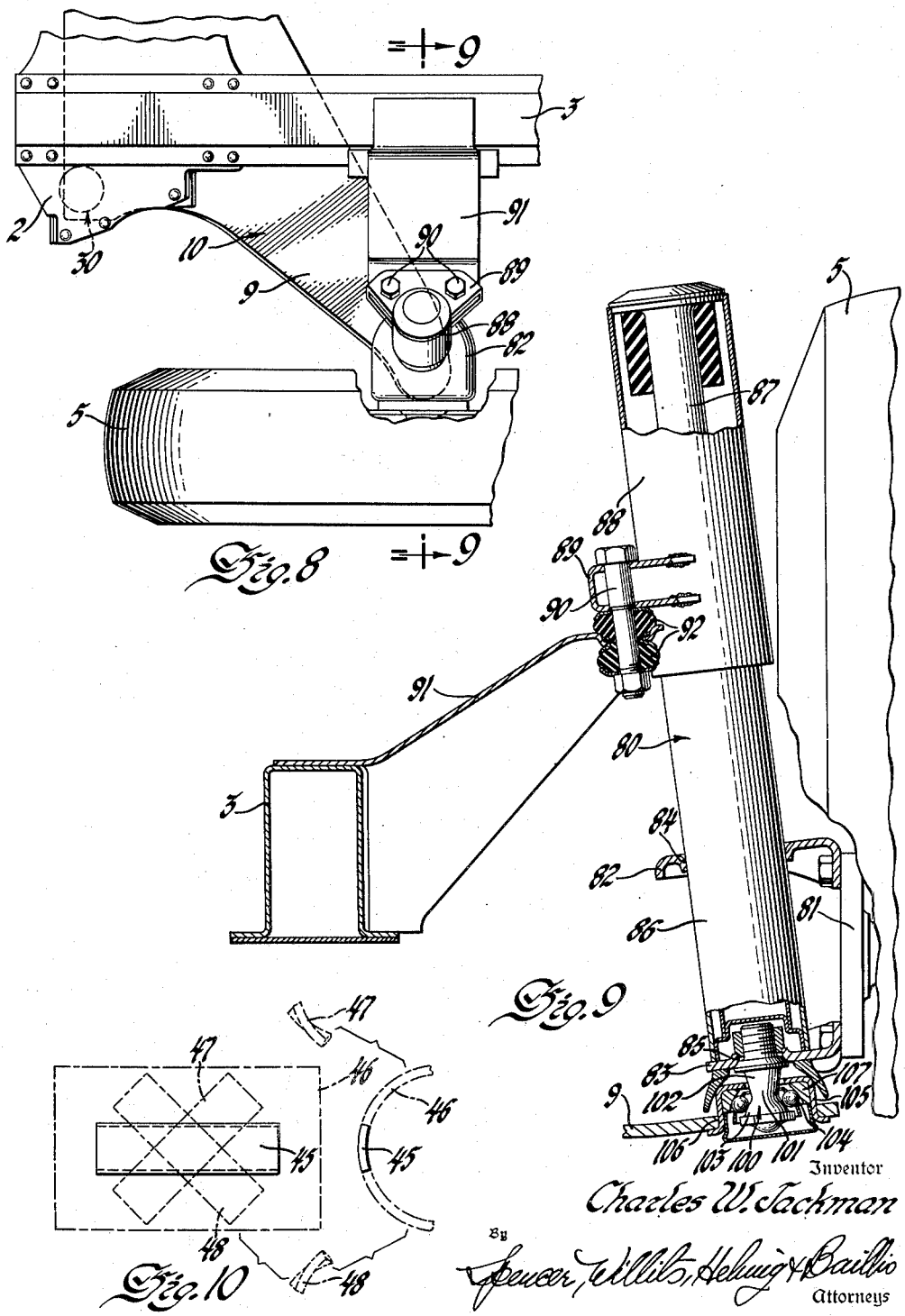

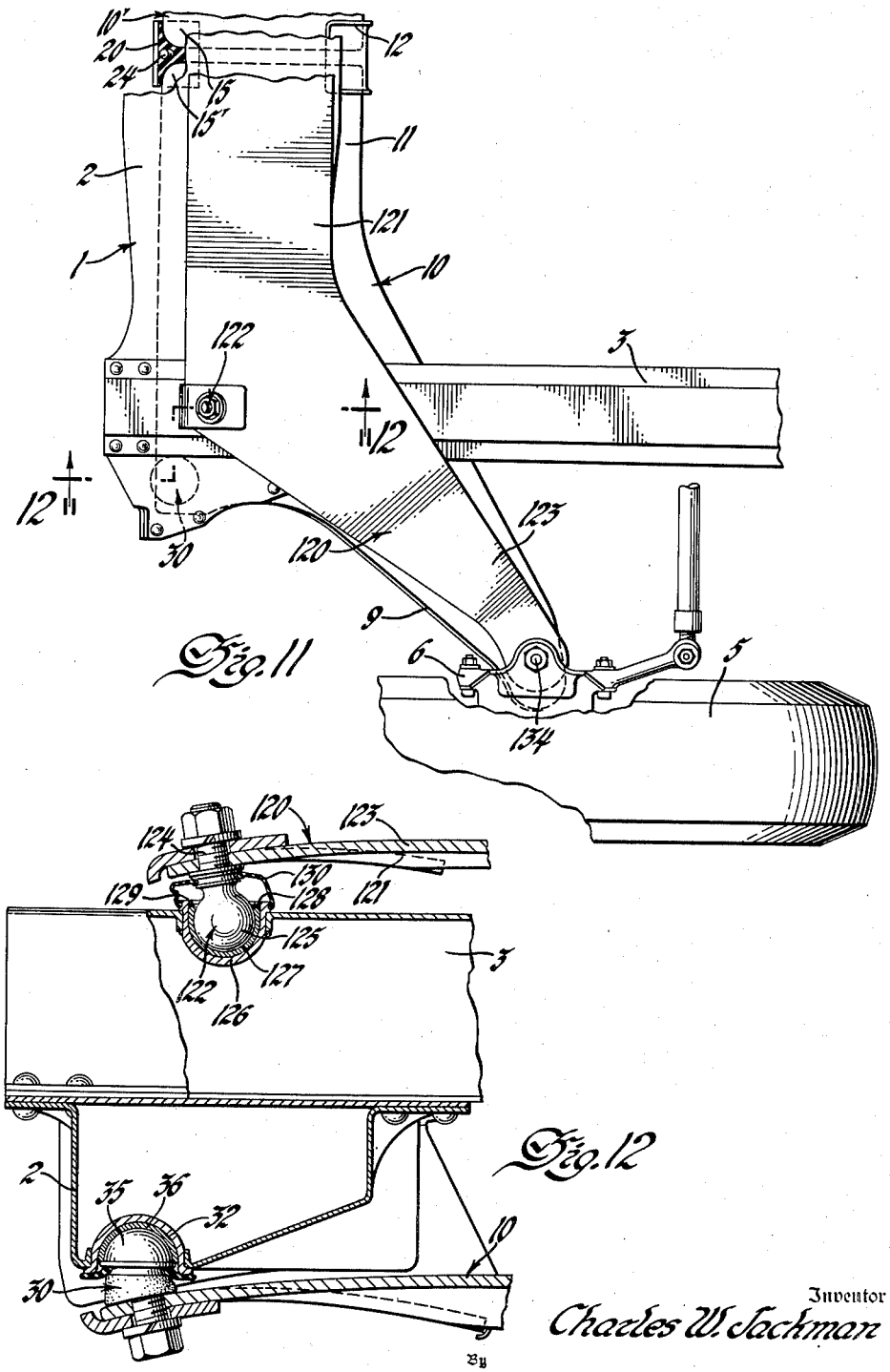

Patented Apr. 21, 1953

2,635,894

UNITED STATES PATENT OFFICE 2,635,894

INDEPENDENT SUSPENSION

Charles W. Jackman, Detroit, Mich., assignor to General Motors Corporation, Detroit, Mich., a corporation of Delaware Application January 29, 1949, Serial No. 73,464

9 Claims. (Cl. 280—96.2)

The invention relates to spring suspensions and particularly to independent spring suspensions for resiliently connecting the wheels or other ground engaging members to the frame or body of a vehicle.

One of the objects of the invention is to provide a vehicle suspension spring having a portion disposed as a lever to twist another portion, the twisted portion being relatively thin and wide in cross section so as to restrict the lever to a substantially fixed plane of motion.

Another object of the invention is to provide means for completely or partially controlling the position of a road wheel with respect to the frame or body of a vehicle, comprising one or more levers and a relatively thin and wide portion disposed to be twisted by the lever or levers and to restrict the lever or levers each in a substantially fixed plane of rotation.

Another object of the invention is to provide a vehicle wheel suspension in which both a load carrying spring and an arm supporting the wheel axis for movement relative to the vehicle body or frame are combined in a single generally L-shaped plate of elastically flexible material.

Another object of the invention is to provide an independent wheel suspension for a vehicle comprising upper and lower members controlling movements of the wheel relative to the frame or body, at least one of the members being approximately L shaped with one leg of the L serving as a torque arm for twisting the other leg and said other leg being relatively thin and wide and curved in cross section parallel with the plane of motion of the torque arm.

Another object of the invention is to provide in a vehicle spring suspension a means for resisting "roll" of the vehicle, comprising a relatively thin and wide spring portion and two levers disposed to twist the spring portion, the spring portion acting also to restrict the levers each in a substantially fixed plane of rotation, each lever being suitably attached to its respective wheel mount in such manner as to aid in holding the axis of the wheel in the proper direction with respect to the vehicle.

In still another and more limited aspect the invention has as its object to provide a trailing arm type independent spring suspension for the dirigible front wheels of an automobile, in which the load carrying spring at each wheel consists of a metal plate approximately L shaped in outline and approximately flat and horizontal when bearing its portion of the vehicle weight, one leg of the L being attached to the frame or body of the vehicle in such manner that a vertical load applied by the wheel to the end of the second leg will cause the latter to act as a lever to twist the first leg, the means of attachment of the first leg to the frame or body preventing movement of the spring in any other direction, and the spring being relatively wide as compared to its thickness so that it is comparatively rigid in any horizontal direction.

These and other objects are accomplished by means hereinafter described and claimed, certain preferred structural embodiments thereof being shown in the attached drawings, wherein:

Figure 3 is a front view of the same taken from line 3—3 of Figures 1 and 2.

Figure 4 is an enlarged sectional view taken substantially on line 4—4 of Figure 3.

Figure 5 is an enlarged detail section view taken on line 5—5 of Figure 3, certain parts being shown in elevation.

Figure 1:
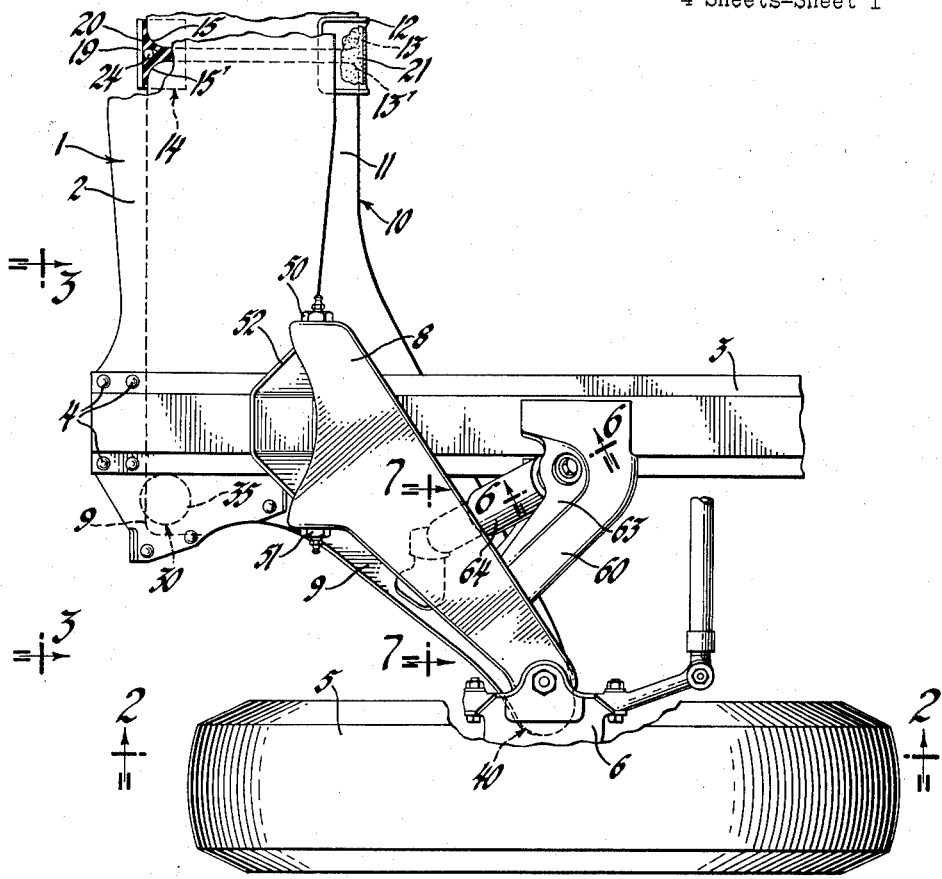
Figure 1 is a plan view of one form of a suspension embodying the principles of my invention as applied to a dirigible front wheel of an automotive vehicle.

Figures 6 and 7 are enlarged detail sectional views taken on lines 6—6 and 7—7, respectively, of Figure 1, certain parts being shown in elevation.

Figure 8 is a plan view of an alternative form of the suspension of Figure 1.

Figure 9 is an enlarged sectional view taken substantially on the line 9—9 of Figure 8.

Figure 10 is a diagrammatic illustration of a particular feature preferably incorporated in each of the various alternative embodiments of my invention.

Figure 11 is a plan view of another alternative form of the suspension of Figure 1.

Figure 12 is an enlarged sectional view taken substantially on line 12—12 of Figure 11.

Referring first to Figures 1 through 7 of the drawings, there is shown a portion of an automotive vehicle frame 1 including a front cross member 2 and a longitudinal side rail 3 rigidly secured together as by rivets 4. Spaced laterally from the frame 1 and somewhat to the rear of the cross member 2 is the left front road wheel 5 mounted on a wheel carrier 6. The wheel carrier 6 is swingably connected to the frame 1 for relative vertical displacement therewith by a trailing arm type parallel linkage consisting of upper and lower arms 8 and 9. The lower arm 9 forms one leg of a relatively thin and wide L shaped plate 10 of spring steel or equivalent elastically flexible material. The other leg 11 of plate 10 extends generally transversely of the vehicle, below the cross member 2, and constitutes a torsion spring carrying the proportionate share of the vehicle load borne by the wheel 5. Within the operative range of vertical displacements of the wheel 5 relative to the frame 1, the plate 10 is disposed in a substantially horizontal plane whereby it is effective to brace the wheel carrier 6 relative to the frame against both lateral and longitudinal thrust forces.

Figures 1A, 1B, 2:
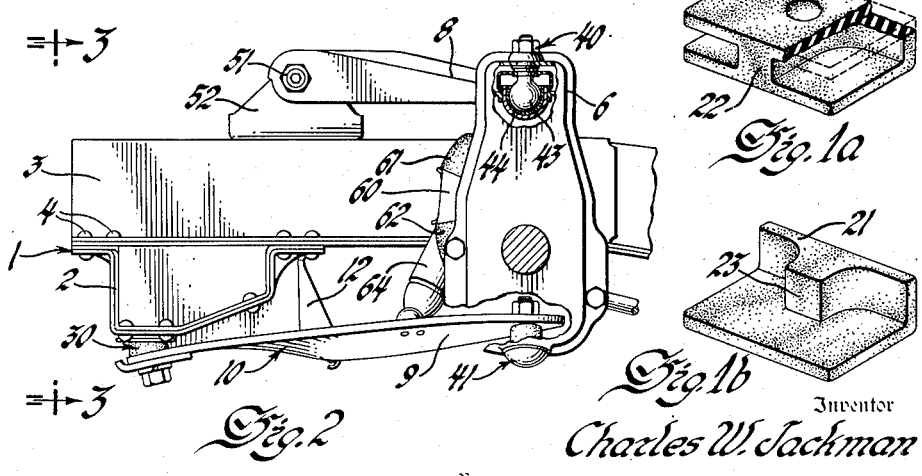
Figures 1a and 1b are enlarged perspective views of certain detail parts shown in Figure 1.
Figure 2 is a side view of the suspension shown in Figure 1, and taken from line 2—2 thereof.

It is to be understood that a similar suspension is provided for the right front wheel of the vehicle, the inner end of the plate 10' thereof (corresponding to plate 10 of the left wheel suspension) being shown in Figures 1, 3 and 4. The two plates 10 and 10' terminate in spaced end-to-end relation as shown, opposite the center of the cross member 2, and both are torsionally anchored to the latter by a bracket 12 which retains their rear inner end corners 13, 13' and a lug 14 which retains their front inner end corners 15, 15'. Bracket 12, which is secured as by welding to the cross member 2, has a generally flat portion 16 overlying the plates 10, 10' adjacent their rear inner end corners 13, 13' and an integral depending flange portion 17 disposed opposite the rear edges of the plates. Lug 14 is of L section with one leg 18 of the L underlying the plates 10, 10' adjacent their front inner end corners 15, 15' and its other leg 19 opposite the front edges of the plates. Resiliently insulating the plates 10, 10' from the lug 14 and the cross member 2 is a U-shaped cushion member 20 of soft rubber or the like, and between the bracket 12 and the plates is an L section member 21 of similar material. As best shown in Figures 1a and 1b, these cushion members have intermediate web-like portions or partitions 22 and 23, respectively, which abut the oppositely disposed ends of the plates. To facilitate installation and removal of the plates 10, 10', the lug 14 is secured to the cross member as by a bolt 24 which passes through aligned apertures provided therefor in the lug 14 and in the web-like portion 22 between the ends of the plates. It will thus be clear that the plates 10, 10' are resiliently supported at their inner ends by the cross member 2 both torsionally and against dislodgement either laterally or longitudinally of the vehicle.

For supporting the outer end of the leg 11 of plate 10 and accommodating its universal pivoting or rocking movement relative to the frame 1 under twisting loads imposed by the lower arm 9 acting as a lever, there is provided a ball and socket joint 30 which is preferably located at the front outer corner of the juncture between lower arm 9 and leg 11. As shown in detail in Figure 5, this ball and socket joint consists of a stamped sheet metal socket member 31 having an internal spherical bearing surface 32, and a stud 34 having an enlarged head portion 35. The socket member 31 may be secured to the cross member 2 and the stud 34 to the plate 10, as shown, or in opposite relation if desired. The enlarged portion 35 of the stud 34 is generally semi-spherical in shape and has a coating 36 of anti-friction material bonded thereto. The coating material 36 may be an oil impregnated sintered metal such as bronze or a molded plastic such as pressed canvas impregnated with oil or graphite. The joint 30 as described is substantially cheaper to construct than the conventional type in which the coating of anti-friction material is applied to the socket rather than to the ball, since an accurate internal spherical surface may be simply formed by stamping operations and the external spherical surface for the ball need be only approximated. It will be understood that since the portion of the vehicle weight borne by the wheel 5 is transmitted through the joint 30 in a direction tending to seat the ball in the socket, no other means of retaining them together is required.

To provide for steering of the wheel 5, the carrier 6 thereof may be connected for universal pivotal movement with the upper and lower arms 8 and 9 through ball and socket joints 40 and 41 respectively. Joint 41, since it is loaded similarly to joint 30, may be constructed in the same manner as previously described for the latter. Joint 40 differs in that the ball portion 43 is positively retained in its socket 44. One preferred method of constructing this joint will be hereinafter described with reference to a similar joint 122 shown in Figure 12.

By reason of the relative location of its connections to the cross member 2, it will be seen that the transversely extending leg 11 of plate 10 will twist about an axis substantially parallel with its longitudinal axis in restraining swinging movements of the lower arm 9 under upwardly directed wheel forces applied at joint 41. Since it is desirable for maximum rigidity against horizontally directed wheel thrust forces that the plate 10 be disposed in a substantially horizontal plane within the range of wheel displacements encountered in operation, the leg 11 is provided with sufficient initial reverse twist that the lower arm 9 assumes a horizontal position at normal or mean vehicle load. Further, for the purpose of eliminating the stretching of the edges due to the helical form which a flat plate assumes when twisted a substantial amount, the leg 11 is provided with an initial camber or curvature (as shown in Figure 4) about an axis parallel with its twist axis. This small degree of curvature does not appreciably reduce the rigidity of leg 11 in a horizontal plane, and has the advantageous effect of materially increasing the constant rate portion of its torsional load-deflection characteristic.

What is believed to occur when twisting a plate which has an initial curvature about an axis parallel to its twist axis is diagrammatically illustrated in Figure 10. In its zero-twist position, the plate is indicated at 45 as forming a longitudinal segment of an imaginary thin walled cylinder 46. When twisted in one direction the plate in effect assumes a helical position within the wall section of the cylinder as indicated in broken outline at 47, and similarly when twisted in the opposite direction it assumes the helical position indicated at 48.

The inner end of the upper arm 8 is pivotally movable relative to the frame 1 about pins 50 and 51 which are supported in a bracket 52 mounted on the frame side rail 3, the pins 50 and 51 being aligned with each other on an axis parallel with the twist axis of the transversely extending leg 11 of the plate 10. Upward movements of the wheel 5 are therefore controlled relative to the frame 1 by the arms 8 and 9 and resiliently restrained by the leg 11.

Secured to the frame side rail 3 and extending outwardly therefrom toward the wheel carrier 6 is a frame extension member 60 for supporting the usual rubber bumpers 61 and 62 for limiting extreme wheel deflections. As shown, the bumpers 61 and 62 are arranged between the upper and lower arms 8 and 9. Adjacent the frame side rail 3, the frame extension 60 has an upwardly swept portion 63 providing a mount for the upper end of a direct acting shock absorber 64. As shown in Figure 6, the portion 63 is provided with an aperture 65 through which extends a rod 66 attached to the upper end of the shock absorber. A pair of rubber biscuits 67 and 68, secured in end-to-end relation on the rod 66 by a threaded nut 69, provide a universal pivot connection between the upper end of the shock absorber 64 and frame extension 60. The lower end of the shock absorber is provided with an eyelet 70 which is secured to a pin 71 extending from an L-shaped bracket 72 which in turn is riveted to the arm 9.

In Figures 8 and 9 is shown an alternative embodiment of my invention in which the upper end of the steering axis is located by a direct acting shock absorber 80, of conventional form but of heavier construction to handle the bending stresses involved. A different wheel carrier 81 is employed having shock absorber supporting means such as upper and lower brackets 82 and 83. As shown, these brackets 82 and 83 are provided with aligned apertures 84 and 85. The lower cylinder 86 of the shock absorber 80 extends through and fits snugly in the aperture 84, and has its lower end abutting and welded to the bracket 83 centrally with the aperture 85. As is conventional, a piston (not shown) operates in the lower cylinder 86 and carries the usual piston rod 87 to which is attached the dust shield or upper cylinder 88. To the side of the upper cylinder 88 is welded a bracket 89 supporting a pair of pins 90, each of which is connected to a frame extension 91 through a pair of rubber biscuits 92.

Figure 9 also shows an alternative universal pivot connection 100 between the wheel carrier 81 and the lower arm 9. A stud 101 secured in the aperture 85 in the bracket 83 has a downwardly extending shank portion 102 terminating in a spherical enlargement 103 providing a bearing surface for a plurality of balls 104. An inverted cup member 105, apertured for passage of the stud 100 and outwardly flanged around its lower end, extends through an opening 106 in the arm 9 and retains a ring 107 having an internal spherical bearing surface resting on the balls 104.

Still another modification of the invention is shown in Figures 11 and 12 wherein the upper end of the steering axis is located by a vehicle antiroll device in the form of a relatively thin and flat U-shaped upper plate 120 of spring steel or equivalent material. While only the left hand leg or arm 123 and approximately half of the intermediate portion 121 are shown, it will be understood that plate 120 is symmetrical with the longitudinal center of the vehicle. The intermediate portion 121 of plate 120 extends transversely of the frame 1 and is pivotally supported at each outer front corner by the frame side rails 3 through ball and socket joints 122.

Each joint 122 comprises a stud 124 terminating in an accurately machined spherical ball 125 which seats and is retained in a socket or shell 126, the interior of which is lined with a layer of moldable lubricant-impregnated, anti-friction material 127 such as pressed canvas. Prior to the assembly of the ball in the shell the layer 127 is cup shaped with the internal surface adjacent its open end being cylindrical, and after inserting the ball thereinto, the open end of the cup is deformed around the ball and covered with a retaining washer 128 and the latter is then secured by rolling the upper open end of the shell 126 thereover to form a flange 129. The layer 127 in this type of bearing is bonded to the inner surface of the shell 126 and the relative movement in the bearing is between the ball 125 and the layer 127. 130 is a conventional flexible dust shield of rubber or the like to exclude the entrance of foreign matter between the bearing surfaces of the joint.

The arms 123 of the U extend rearwardly and outwardly at each side toward the wheels 5 and are connected to the wheel carriers 6 through ball and socket joints 134, which are of the ball-retained type similar to joints 122. As in the case of the lower plates 10 and 10', the upper plate 120 lies substantially horizontal at mean vehicle loads to provide maximum rigidity in that plane.

During simultaneous and equal vertical displacements of both front wheels 5 relative to the frame 1, the upper plate 120 merely rocks about its pivots 122 on the side rails 3. When one wheel is displaced upwardly relative to the other wheel, however, the arms 123 effect a twisting of the intermediate portion 121 about an axis substantially parallel with its longitudinal axis. The intermediate portion 121 thus acts as a torsion spring to restrain relative displacements of the wheels and thereby tends to maintain the frame 1 and the vehicle body mounted thereon in a level position. To avoid the edge stretching effect when a flat plate is twisted the intermediate portion 121 is provided with an initial camber or curvature about an axis parallel with its twist axis, as in the case of the transversely extending legs 11 of the lower plates 10 and 10'.

I claim:

1. In an independent vehicle wheel suspension wherein a vehicle frame and wheel carrier are provided, upper and lower members for controlling the relative displacement of the vehicle frame and wheel under load, one of said members consisting of a relatively thin and wide spring metal plate of approximately L-shape in outline with one leg of the L secured at its outer end to the wheel and constituting a lever for twisting the other leg of the L, said other leg extending transversely of the vehicle and constituting a load supporting torsional spring, said other leg being disposed in a substantially horizontal plane when subjected to its proportionate share of the mean vehicle load and provided with connections to the frame anchoring it against longitudinal and lateral displacement relative to the frame, said connections being located with respect to the outer end of the first leg to provide twist reaction forces on said other leg when the wheel moves upwardly relative to the frame.

2. In a vehicle road wheel suspension, means for controlling the position of the wheel relative to the frame of the vehicle including a transversely extending generally flat and horizontal plate spring of relatively thin and wide cross section, an arm integral with said spring and extending generally rearwardly from the outer end thereof toward the axis of the wheel, a connection between said arm and the wheel and connections between said spring and the vehicle frame, said last named connections including a torque reaction coupling between the inner end of the spring and the frame and a universal pivot between the frame and the spring adjacent the outer end and front edge of the latter.

3. In a suspension for a vehicle frame from a pair of road wheels thereunder, means for resisting roll of the vehicle comprising a relatively thin and wide and substantially horizontal spring plate extending transversely of the vehicle, said plate having rearwardly directed continuations at its opposite ends terminating in connections to the respective wheels, said plate having a pair of transversely spaced universal pivot connections with the frame restraining its displacement longitudinally and transversely of the vehicle but accommodating its rocking movement relative to the frame during vertical displacement of either one or both wheels relative to the frame.

4. In a spring suspension for a vehicle road wheel, a vehicle frame member, a plate member of elastically flexible material constituting a load supporting spring, means accommodating universal rocking movement of the members relative to each other but restraining their relative movement in the plane of the plate member, said means including a socket secured to one of the members and having a spherical metal bearing surface, a ball secured to the other member, said ball having an anti-friction coating of lubricant impregnated material bonded thereto and engaging said socket surface.

5. In an independent spring suspension for the left and right road wheels at one end of a vehicle, a vehicle frame, means swingably connecting each wheel to the frame and controlling its vertical displacement relative thereto under load, said means consisting of upper and lower arms each extending outwardly and rearwardly from the frame toward the wheel, said upper and lower arms each being relatively thin and wide in horizontal section and having integral transversely extending torsion spring portions of similar section spacedly disposed from each other in substantially horizontal planes, the torsion spring portion of one of the arms for one wheel being torsionally anchored to the frame for resisting upward swinging movements of its associated wheel relative to the frame, and the torsion spring portion of the other arm for said one wheel and the torsion spring portion of the corresponding arm for the other wheel being rigidly interconnected to resist vertical movements of the wheels relative to each other.

6. The combination set forth in claim 2, wherein said means also includes a second arm vertically spaced from said first named arm, and pivotal connecting means between the ends of said second arm and said wheel and frame, respectively, said connecting means including a universal pivot between said arm and said wheel, and a pivotal connection between said arm and said frame.

7. The combination set forth in claim 1 wherein said other member consists of a direct acting shock absorber having one of its ends fixed to the wheel carrier and its opposite end yieldingly connected to the frame.

8. In an independent spring suspension for a dirigible road wheel of a vehicle, a vehicle frame, a wheel carrier, upper and lower members for controlling the relative displacement of the frame and carrier, one of said members consisting of a relatively thin and wide spring metal plate of approximately L shape in outline with one leg of the L universally pivoted at its outer end to the carrier and constituting a lever for twisting the other leg of the L, said other leg extending transversely of the vehicle and constituting a load supporting torsional spring, said other leg being disposed in a substantially horizontal plane when subjected to its proportionate share of the mean vehicle load and means connecting said other leg to the frame and anchoring said other leg against longitudinal and lateral displacement relative to the frame, said connections being located with respect to the outer end of the first leg to provide twist reaction forces on said other leg when the wheel moves upwardly relative to the frame, said other member comprising a lateral extension from the frame and a direct acting shock absorber including two telescopic cylinders, one of said cylinders being fixed to the carrier and constituting a king pin for the wheel, the other of said cylinders being provided with a bracket fixed thereto, and a grommet of soft resilient material anchored to both the bracket and the extension and forming a yieldable connection therebetween.

9. The combination set forth in claim 1 wherein said other leg has an initial curvature about an axis parallel with its twist axis, and the other of said members comprises an arm substantially parallel with said one leg, upper and lower connecting portions on said wheel carrier, a universal joint between the outer end of said one leg and one of said connecting portions, and a universal joint between the outer end of said other member and the other of said connecting portions, and a pivotal connection between the vehicle frame and said other member to permit relative movement between said other member and said frame about an axis parallel to said twist axis.

CHARLES W. JACKMAN.

References Cited in the file of this patent

UNITED STATES PATENTS

| Number | Name | Date |
|---|---|---|
| 372,059 | Blydenburgh | Oct. 25, 1887 |
| 455,335 | Jarrell | July 7, 1891 |
| 1,673,467 | Maurer | June 12, 1928 |
| 1,722,206 | Gatter | July 23, 1929 |
| 1,804,713 | Stockton | May 12, 1931 |
| 1,964,105 | Bowen | June 26, 1934 |
| 2,018,653 | Best | Oct. 29, 1935 |
| 2,074,748 | Hufferd et al. | Mar. 23, 1937 |
| 2,083,085 | Palmer | June 8, 1937 |
| 2,109,311 | Dayton | Feb. 22, 1938 |
| 2,122,655 | Niles | July 5, 1938 |
| 2,238,380 | Almen | Apr. 15, 1941 |
| 2,290,923 | Wahlberg | July 28, 1942 |
| 2,371,864 | Woolson et al. | Mar. 20, 1945 |
| 2,457,583 | McCaslin | Dec. 28, 1948 |

FOREIGN PATENTS

| Number | Country | Date |
|---|---|---|
| 107,719 | Sweden | June 22, 1943 |
| 212,962 | Switzerland | Apr. 1, 1941 |
| 220,146 | Great Britain | Aug. 14, 1924 |
| 745,283 | France | Feb. 14, 1933 |
| 798,613 | France | Mar. 10, 1936 |